US009118617B1

(12) United States Patent
Giroux et al.

(10) Patent No.: US 9,118,617 B1
(45) Date of Patent: Aug. 25, 2015

(54) METHODS AND APPARATUS FOR ADAPTING THE PROTECTION LEVEL FOR PROTECTED CONTENT

(75) Inventors: David Giroux, Sharon, MA (US); Kenneth Allen Rogers, Hudson, MA (US)

(73) Assignee: EMC CORPORATION, Hopkinton, MA (US)

( * ) Notice: Subject to any disclaimer, the term of this patent is extended or adjusted under 35 U.S.C. 154(b) by 1650 days.

(21) Appl. No.: 11/541,360

(22) Filed: Sep. 29, 2006

Related U.S. Application Data

(60) Provisional application No. 60/753,674, filed on Dec. 23, 2005.

(51) Int. Cl.
H04L 29/00 (2006.01)
H04L 29/06 (2006.01)

(52) U.S. Cl.
CPC ................................ H04L 63/00 (2013.01)

(58) Field of Classification Search
USPC ................. 713/150, 164, 171, 176, 189, 193; 726/1, 26, 27, 32
See application file for complete search history.

(56) References Cited

U.S. PATENT DOCUMENTS

| 5,892,900 | A | 4/1999 | Ginter et al. | |
|---|---|---|---|---|
| 6,701,433 | B1 * | 3/2004 | Schell et al. | 713/164 |
| 6,948,073 | B2 * | 9/2005 | England et al. | 726/32 |
| 7,546,641 | B2 * | 6/2009 | Robert et al. | 726/30 |
| 2001/0020251 | A1 * | 9/2001 | Sheikh et al. | 709/224 |
| 2002/0161996 | A1 * | 10/2002 | Koved et al. | 713/150 |
| 2003/0009672 | A1 * | 1/2003 | Goodman | 713/176 |
| 2003/0061489 | A1 * | 3/2003 | Pelly et al. | 713/176 |
| 2004/0221172 | A1 * | 11/2004 | Stamos et al. | 713/200 |
| 2005/0039034 | A1 * | 2/2005 | Doyle et al. | 713/193 |
| 2006/0048224 | A1 * | 3/2006 | Duncan et al. | 726/22 |
| 2006/0129496 | A1 * | 6/2006 | Chow et al. | 705/59 |

FOREIGN PATENT DOCUMENTS

WO    WO 0241554 A2 *    5/2002

* cited by examiner

Primary Examiner — Jeffrey Twu
Assistant Examiner — Helai Salehi
(74) Attorney, Agent, or Firm — Dergosits & Noah LLP; Todd A. Noah

(57) ABSTRACT

A DRM system is provided wherein a policy can be established such that the DRM system controls access to a protected content unit, wherein the policy evaluates a condition so that the DRM system adaptively varies the actions that a user is authorized to perform with the protected content unit in response to changes in the condition. The techniques described herein enable a protection level for a protected content unit to be varied in response to changes in one or more condition, such as environmental conditions and/or an historical usage conditions. The techniques described herein also enable a set of policies to be established for a DRM system such that the DRM system controls access to multiple protected content units in accordance with the set of policies. Pursuant to these policies, the DRM system can adaptively vary access to multiple protected content units in response to one or more conditions.

20 Claims, 6 Drawing Sheets

METHODS AND APPARATUS FOR ADAPTING THE PROTECTION LEVEL FOR PROTECTED CONTENT

RELATED APPLICATIONS

This application claims priority under 35 U.S.C. §119(e) to U.S. Provisional Application Ser. No. 60/753,674, entitled "ACCESS CONTROL SYSTEMS THAT VARIES PROTECTION LEVEL BASED ON ENVIRONMENTAL CONDITIONS AND HISTORICAL USAGE INFORMATION," filed on Dec. 23, 2005, which is incorporated herein by reference in its entirety.

FIELD OF THE INVENTION

The present application relates to digital rights management systems for managing access to digital content (e.g., documents, video, audio, email, and other content).

BACKGROUND OF INVENTION

Digital rights management systems exist that control access to digital content. One or more access control policies can control, for example, which users may access particular units of content, when particular users may access particular content, from what devices particular users may access protected content, what particular users may do with that content (e.g., read, modify, copy, save, print), and whether particular users may be limited to accessing content having a watermark rendered over it (e.g., by physically printing a watermark when a document is printed, by applying a watermark on a display screen when a document is displayed, etc.) or not.

FIG. 1 is a block diagram of an illustrative prior art digital rights management (DRM) system 100 that includes a DRM policy server 102, an authoring device 106a, an access device 106b, and a content server 108. Numerous types of electronic content may be managed using the DRM system 100. Examples include word processing documents, formatted documents (e.g., PDF documents), spreadsheets, video files, audio files, image files, email messages, and/or other types of electronic content. Each type of content may be created and/or viewed by one or more particular types of application programs. An example of such a DRM system is described in, for example, U.S. Pat. No. 6,978,376, entitled "INFORMATION SECURITY ARCHITECTURE FOR ENCRYPTING DOCUMENTS FOR REMOTE ACCESS WHILE MAINTAINING ACCESS CONTROL," filed on Dec. 15, 2000, which is incorporated herein by reference in its entirely.

The DRM scheme implemented by system 100 encrypts protected content to prevent unauthorized access. The DRM scheme further implements a scheme to ensure that only authorized users gain access to the information necessary to decrypt the protected content, and only in a manner that enables each user to access the content and perform the actions with that content that they are authorized to perform consistent with the access control policy for that content.

DRM policy server 102 performs several functions associated with the digital rights management of protected content. An encryption key is generated (e.g., by the DRM policy server, the authoring device or otherwise). The DRM policy server 102 maintains decryption keys for protected content (also referred to as content "registered" with the DRM system), authenticates requests for viewing registered content, and grants access to registered content by providing decryption keys and associated access policies to authorized users. The DRM policy server may maintain a secure central database which provides an association between registered users that created or authored the registered content, the registered content, decryption keys for the registered content, access policies for the registered content, and registered users authorized to access each unit of protected content.

Content server 108 may generate and/or store units of content that may be managed by the DRM system. Content server 108 may have one or more application programs to generate various types of content (e.g., an email exchange server application, a word processing application, an image generation application, etc.). Content on content server 108 may be created and/or modified in response to user actions on an authoring device (e.g., authoring device 106a). A software plugin (not shown) for the DRM system may be installed on the authoring device and may allow the selection of an option to protect a unit of content (e.g., a word processing document) when it is opened or created on the access device in response to a user's actions. The plugin can connect to the DRM policy server over a secure communication link (e.g., via an SSL connection), and the user can be authenticated by the DRM policy server through a user interface presented by the plugin. The DRM policy server may connect to one or more resources in a networked computer system (e.g., a directory service storing authentication information such as a user name and password), so that the user may be authenticated based upon information provided via the plugin user interface, to the DRM policy server.

Once authenticated, the DRM user interface allows the authenticated user to set a policy to protect the content. The user may select a pre-defined policy or create a new one. The policy may specify any of the control criteria discussed above (e.g., which user(s) may access the document, when the document may be accessed, from where the document may be accessed (e.g., only local network access), what actions may be performed with the document (e.g., printing, copying, modifying), whether a watermark should be applied to the document, etc.).

A unique identifier is created for the content (e.g., by applying a hashing algorithm to the content), in association with a request to register the content with the DRM policy server that is sent 122 by the authoring device 106a. In response, a content encryption key is generated. The content is encrypted using the content encryption key and sent 126 to the content server 108 where it is stored along with an unencrypted address for the DRM policy server 102. Optionally, an unencrypted unique identifier for the content may also be stored with the content. The DRM policy server 102 stores the policy and the content encryption key, and associates them with the content (e.g., via the unique identifier for the content) in any suitable way. The unique identifier and the unencrypted address of the DRM policy server may be embedded in the content (e.g., in an unencrypted portion of the content).

When a user attempts to access the protected content using an access device 106b, the encrypted content is transmitted 112 from the content server 108 to the access device 106b, along with the unencrypted address of the DRM policy server 102 and optionally also the unencrypted unique identifier for the content. Alternatively, the unique identifier for the content may not be transmitted, but rather may be regenerated by the access device (e.g., by applying a hashing algorithm to the content). The access device can then use the unencrypted address of the DRM policy server to request access to the protected content associated with the unique content identifier.

Access device 106b is a device through which a user may seek to access a protected unit of content. For example, if the content server 108 is a word processing server, a user may attempt to access a protected word processing document on the word processing server via an access device (e.g., a workstation). The protected unit of content may be transmitted 112 from the content server 108 to the access device 106b (e.g., via a network connection). As discussed above, the protected content is encrypted, so that the user utilizing the access device 106b cannot access it without authority granted by the access policy that is associated with the protected unit of content and is stored on the DRM policy server 102.

When a user on access device 106b seeks access to a protected content unit, it can only gain access by retrieving the content key from the DRM policy server 102. If the access device 106b has a DRM plugin installed, the plugin issues a communication 114 to the DRM policy server 102 (e.g., using the address associated with the content) to request access to the protected unit of content. If no plugin is installed, information within the content may point the device to a server from which the DRM plugin may be installed. The DRM policy server 102 determines whether the user using the access device 106b is authorized to access the specified unit of content. If not, the access request is denied. If the user is authorized, the content decryption key is transmitted 116 from the DRM policy server 102 to the access device 106b. This content key may be encrypted using a communication session key for the transaction between the access device and the DRM policy server so as to keep it secure. The content key may be used to decrypt the unit of content so as to generate a decrypted unit of content which may be accessed by the user. However, the DRM policy server 102 further transmits 118 policy information to the access device, which dictates the actions the user may perform on the unit of content. The DRM software plugin installed on the access device enforces the policy.

BRIEF DESCRIPTION OF DRAWINGS

In the drawings, in which like reference numerals represent like elements.

DETAILED DESCRIPTION

Figure 1:
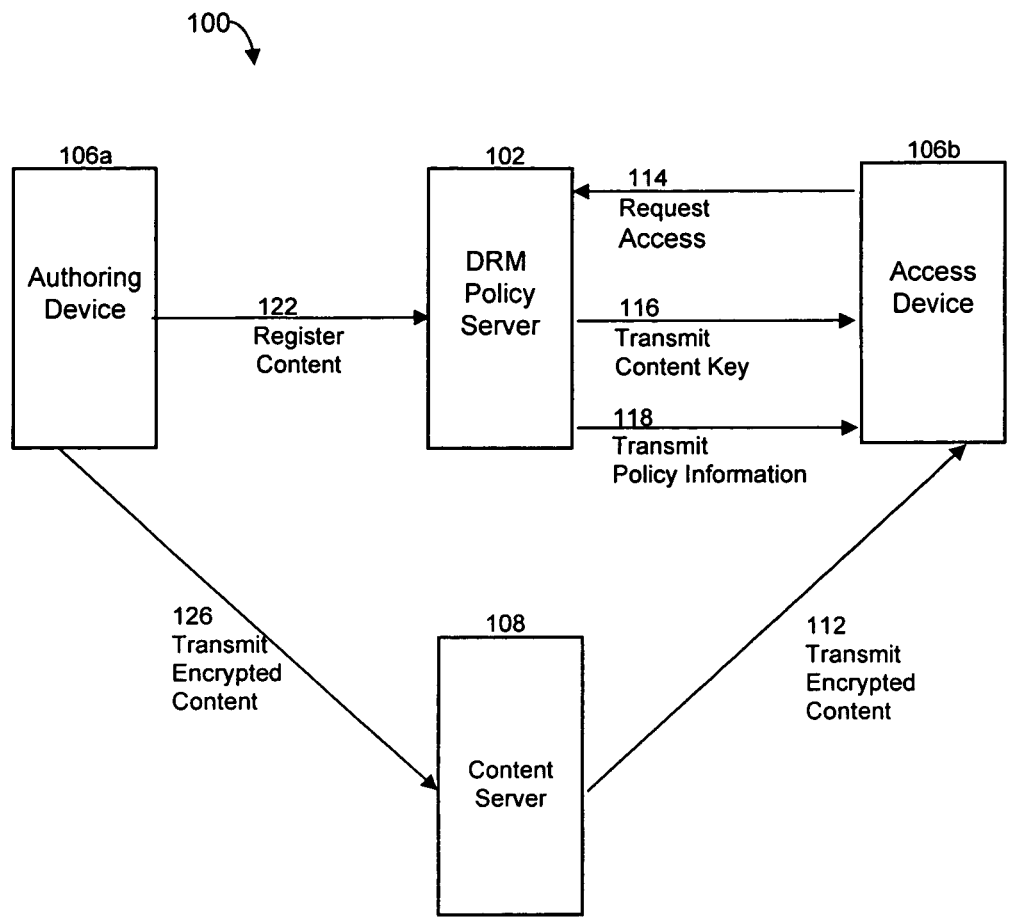
FIG. 1 is a block diagram of a prior art digital rights management system.

Conventional DRM systems implement protection levels for content units that are static. Therefore, if a system administrator desires to change the protection level provided for one or more content units, the policy that defines the protection level must be manually changed by the system administrator to achieve the desired change in the protection level.

Applicants have appreciated that in some circumstances it may be desirable to automatically adapt the protection level provided for one or more content units in response to one or more conditions. For example, in response to the Home Land security advisory system of the United States government indicating an increased threat level, the protection level for one or more sensitive pieces of content automatically may be adapted to tighten the security for that sensitive content and further restrict access to it. As another example, if it is determined that a user has begun to act in an out of character and suspicious manner (e.g., copying large volumes of documents) the protection levels for other documents accessible to the user automatically may be adapted to restrict access (e.g., to prohibit copying by that user). As yet another example, if a security breach is detected in a computer system on which one or more protective content units reside (e.g., a virus destroying content, a detected intrusion by an unauthorized user), the protection level for one or more content units automatically may be adapted to restrict access to them.

Applicants have appreciated that by providing a DRM system that can automatically adapt the protection level for one or more content units, increased flexibility and/or greater security can be provided for content units by enabling the protection levels provided therefore to be adapted based upon any desired condition. It should be appreciated that the conditions described above that can be evaluated and trigger the adapting of the protection level for one or more content units and the ways in which protection levels can be adapted are merely exemplary, and that numerous other types of conditions can be evaluated and can trigger adapting protection levels in numerous other ways.

In accordance with one embodiment, an administrator of a DRM system is provided with the ability to implement one or more policies that provide protection levels for one or more content units, and each policy can evaluate one or conditions in establishing the protection level. The administrator optimally can be further provided with the ability to implement one or more information collectors that are capable of collecting information about conditions from any desired source. Thus, an administrator is able to customize one or more policies that can adapt the protection level for one or more content units based upon any desired conditions(s) (e.g., the national security threat level, user historical usage patterns, identified network security threats, or any other desired condition).

As discussed above, in one embodiment, the condition(s) that can be evaluated to adapt the protection level for one or more content units can include an environmental condition that can relate to the environment of the computer system on which the DRM system is implemented (e.g., network activity, security threats, usage patterns, etc.) or can more globally relate to other environmental conditions (e.g., the national security threat level, a virus or other activity on the Internet, etc.). One or more evaluated conditions can be used to adapt the protection level for a single content unit or alternatively the protection levels for multiple content units can be adapted based upon a same condition (e.g., the protection levels for multiple content units can be increased in response to an increase in the national security threat level or the detection of a security breach in the computer system).

As discussed above, another example of a condition which can be evaluated to adaptively vary the protection level for one or more content units is historical information relating to one or more actions taken by a user (e.g., actions that are out of character or otherwise suspicious). It should be appreciated that these actions need not be related to the particular content unit whose protection level may be adapted, but can be related to other actions, including actions relating to other content units (e.g., copying large volumes of documents in one of the examples described above).

Some conventional DRM systems perform a limited evaluation of historical information when establishing the protection level for one or more content units. However, they do not adapt the protection level in response to this historical information (or any other condition). For example, some DRM systems provide the ability to limit the number of times a particular user may take a particular action with respect to a content unit (e.g., a user may be authorized to print a document only three times or less). In such systems, the policy can gather information (e.g., from a source external to the DRM system) indicating the number of times the user has printed the document and can prohibit any further printings after the user has printed the document three times. It should be appreciated that in that example, the protection level for the content unit is never adapted, as the user is always capable of printing the document a first, second and third time, and that the DRM system never adapts that protection level in response to any condition.

The above-mentioned embodiments can be implemented in any suitable way, as they are not limited to any particular implementation. Examples of specific implementations are discussed below, but it should be understood that these implementations are presented only as illustrative examples, and that other implementations are possible. The techniques described below can be used in a DRM system like the system of FIG. 1 described above. However, it should be appreciated that the techniques described herein are not limited in this respect, and can be used with any type of DRM system.

As discussed above, conventional DRM systems control access to content based on a policy that applies a fixed protection level to the content. In such systems, after an administrator defines a policy that sets the protection level for a given content unit, manual intervention is required (e.g., by the administrator) to modify the protection level associated with the content unit. By contrast, some of the techniques described herein can be used to enable a DRM system to evaluate one or more conditions (e.g., environmental conditions, usage history, other information from external sources) and adaptively modify the protection level associated with one or more content units in response to changes in the condition(s). The term "condition" is not intended to be limiting in any respect, and can include any type of condition or other information capable of being evaluated by a policy.

Figure 2:
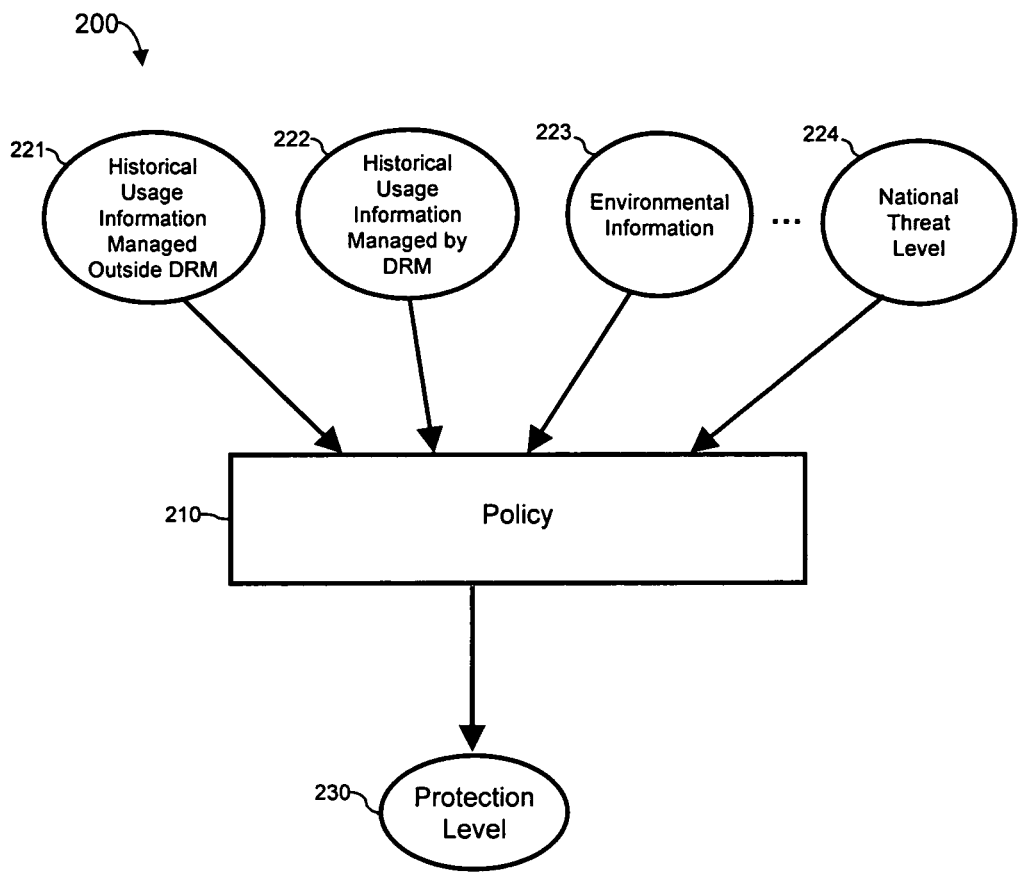
FIG. 2 is a schematic representation of a policy that implements an adaptive protection level in accordance with one embodiment.

FIG. 2 is a schematic representation 200 of a policy 210 that specifies a protection level that evaluates one or more pieces of information (or conditions) and establishes a protection level for one or more content units that may adaptively vary in response to changes in the information. Policy 210 can be a rule (e.g., a function) whose inputs include pieces of information 221-224, and whose output defines a protection level 230 for a content unit. Policy 210 may be defined by an administrator of the DRM system, or another authorized individual, in any suitable manner (e.g., using one or more if-then statements or in any other suitable way) as the techniques described herein are not limited in this respect.

As previously described, the protection level for a protected content unit can include a specification of who can access the content unit, from where they can access it, when they can access it, and/or what they can do with it (e.g., view, edit, copy, save, print, forward). Pieces of information 221-224 may be any kind of information, including but not limited to, information managed by the DRM system (e.g., historical usage information maintained by the DRM system relating to access to the protected content) and information from sources outside the DRM system. As should be appreciated, the pieces of information 221-224 may vary over time. Furthermore, it should also be appreciated that any number of pieces of information may be evaluated by the policy 210, as the techniques presented herein are not limited to evaluating any particular types of information from any particular types or number of sources.

As mentioned above, the protection level associated with one or more protected content unit(s) may be adaptively varied based on changes in the information that the policy evaluates, so that the policy need not be manually modified by an administrator (or other authorized user) to adapt or modify the protection level. This allows the DRM system to automatically adapt the protection level for one or more protected content unit(s) based on any of the information that the policy evaluates. The information evaluated by the policy may be any kind of information, as the techniques presented herein are not limited in this respect. Information that a policy evaluates can come from different classes of sources. For example, information can come from sources external to the DRM system (i.e., the information is not maintained by the DRM system) and may be referred as external information. External information can come from sources within a computer network to which the DRM system belongs, or more globally from other sources anywhere beyond the computer network. Information deriving from sources within the DRM system can be referred to as internal information, an example of which includes historical usage information for protected content units maintained by the DRM system. Historical usage information can include, for example, information describing the number of prior accesses by one or more users to particular protected content units and/or actions performed by the user(s) on the protected content units.

In one embodiment, historical information can include information from any external source (e.g., in the computer system) beyond the DRM system that may maintain historical information.

As described above, one example of using historical information relates to a user acting suspiciously or out of character. This can be determined in any suitable way. For example, in accordance with one embodiment the capability is provided to the DRM system to collect information from one or more external sources. Information of any type can be collected from any external source, as the techniques described herein are not limited to evaluating any particular types of historical information, or collecting them in any particular manner, or from any particular type of source. In one embodiment, information can be collected from a source that maintains historical information about the activities of one or more users. This information can be evaluated by a policy to determine that a user is acting suspiciously or out of character. Alternatively, the historical information can be evaluated by the external source, which can provide an indication to the DRM system that a user is acting suspiciously or out of character, either instead of or in addition to providing the DRM system with the information upon which that evaluation is based.

Another example of the type of information that may be evaluated is information that relates to environmental conditions outside of the DRM system. Environmental condition information may relate to a computer network to which the DRM system belongs, or other conditions beyond the computer network.

The environmental condition information relating to the computer system to which the DRM system belongs may be of any type, as the techniques described herein are not limited to evaluating any particular types of environmental conditions as a basis for adaptively varying the protection level for one or more protected content units. For example, the information relating to activity on the computer network can include information relating to suspicious activity or potential security threats on the computer network (e.g., intrusion by an unauthorized user) and can be collected from any source that determines such a condition. In one embodiment, when suspicious activity or potential threats are detected, the protection level for one or more content units can be adapted to increase the protection level and reduce access. This can be done for individual content units (e.g., particularly sensitive ones or ones associated with the nature of the detected threat or suspicious activity), or more globally by increasing the protection level for all content units. It should be appreciated that suspicious activity or security threats can be defined and detected in any suitable manner, as the techniques described herein are not limited in this respect. In addition, any type of environmental condition in a computer system can be detected, as the techniques presented herein are not limited to evaluating security threats or any other type of condition.

Environmental information may also be related to conditions outside of, or not specifically limited to, the computer system to which the DRM system belongs. An example of such information relates to security-related conditions. Security-related conditions or information may take any suitable form and be provided by any source. For example, such information may be provided by an external private organization or governmental agency (e.g., a government agency responsible for security (e.g., the Department of Homeland Security) may issue information relating to a terrorist threat level). Other examples of environmental conditions not specifically limited to the computer system that the DRM system belongs to can include environmental condition information relating to other systems, such as transportation-related systems (e.g., air traffic control systems), suspicious activity or potential threats detected in other computer systems (e.g., viruses or other harmful activity on the Internet), security systems protecting private premises (e.g., security alarm systems), and/or any other type of environmental condition information, as the techniques presented herein are not limited in this respect. As with the embodiment described above relating to suspicious activity or potential threats detected in the computer system to which the DRM system belongs, when suspicious activity or potential threats are detected elsewhere, the protection level for one or more content units can be adapted to increase the protection level and reduce access, either for individual content units or more globally, as the techniques described herein are not limited in this respect.

It should be appreciated that a single or multiple different types of information, and/or information from a single or multiple different sources, may be evaluated by a policy to determine a protection level for one or more protected content units. It should also be understood that the examples of sources and types of information and conditions described herein are not intended to limit the types and sources of information and conditions that may be evaluated by a policy, as the techniques described herein are not limited in this respect. In one embodiment, it is contemplated that a DRM system can be provided with an interface that enables administrators to collect external information of one or more conditions and establish a customized policy that evaluates any desired information to adapt the protection level for one or more content units in any desired way.

A policy that adapts the protection level for one or more protected content units in response to a condition can vary the protection level uniformly with respect to multiple users, or can vary (or leave intact) the authorized actions for one or more protected content units for different users. For example, in response to one or more conditions that may impact different users differently, the authorized actions for some users may be varied differently than for others, based on the identity of the users individually or on one or more classes to which they belong. For example, in response to a condition evidencing a security threat (e.g., in the computer system or more globally), the protection level for one or more content units may be tightened significantly with respect to a certain class of users while being tightened less restrictively (or not at all) with respect to other users that are situated differently (e.g., may have a higher security clearance). These are merely examples, as the ways in which the protection level for one or more protected content units can be adapted to one or more conditions is not limited in any respect by the manner in which different users are impacted.

As should be appreciated from the foregoing, in accordance with one embodiment, one or more policies can be established that evaluate one or more conditions when determining the protection level for a protected content unit, and adaptively vary the protection level depending upon the state of the condition. Thus, in accordance with one embodiment, when an access request is attempted to a protected content unit, any condition information evaluated by a policy associated with the protected content unit may be updated to reflect the current state of the condition, and the protection level for the protected content unit may be evaluated considering that updated condition information.

Figure 3:
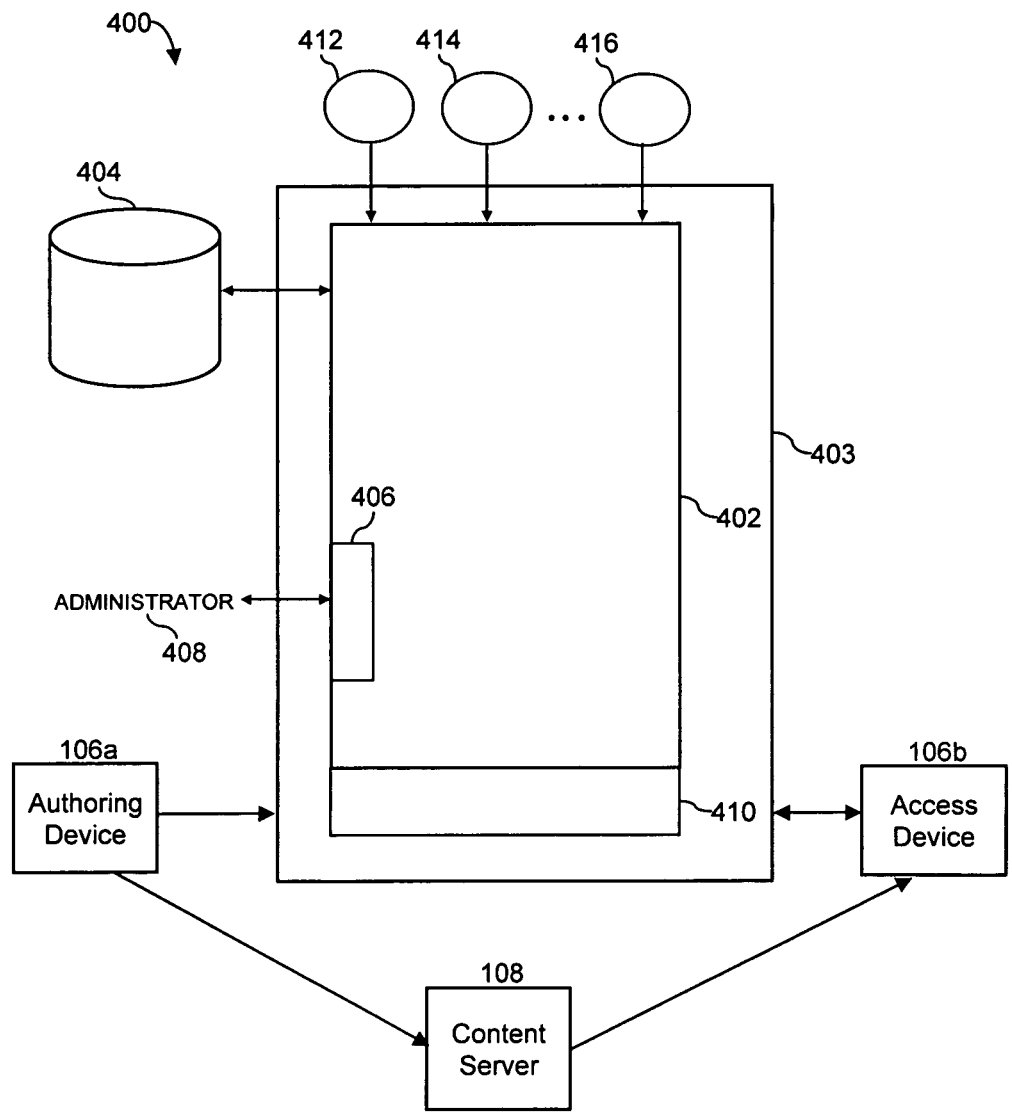
FIG. 3 is a block diagram of a system including a policy server that implements an adaptive protection level in accordance with one embodiment.

FIG. 3 illustrates one possible implementation of a DRM system which can enforce policies that adaptively vary the protection level of one or more protected content units based on an evaluation of one or more pieces of information or conditions. The adaptive techniques described herein are illustrated in FIG. 3 as being provided in a DRM system of the type illustrated in FIG. 1. However, it should be appreciated that the techniques disclosed herein relating to providing a DRM system that can adaptively vary the protection level for one or more content units are not limited in this respect and can be provided in a DRM system of any type.

Computer system 400 includes DRM policy server software 402 (referred to below as the DRM policy server) executing on a computer 403 that is coupled to a storage device 404. The computer 403 may be any type of computer programmed with the DRM policy server software, including a computer dedicated exclusively to performing the functions of the DRM policy server, or a computer also programmed to perform other functions.

The DRM policy server software 402 may be software that manages policies associated with protected content, and optionally also manages content decryption keys for the associated protected content in the manner discussed above in connection with the system of FIG. 1. In some embodiments, the DRM policy server 402 stores and manages policies and decryption keys for protected content directly on the computer 403. Alternatively, policies and decryption keys may be managed by the DRM policy server 402 but stored on any other computer or storage device accessible to the DRM policy server, such as storage device 404.

A user interface 406 allows an administrator 408, or any other user having authorization (e.g., a user who is authorized to register content with the DRM system), to create or modify policies, to define one or more policies (collectively referred to as a policy set 410). Policy set 410 may be stored directly on the computer 403, or on any other device accessible to the DRM policy server (e.g., storage device 404).

In one embodiment, the policies may specify protection levels for protected content units that evaluate information or conditions from one or more information sources, such as information sources 412, 414, and 416, so that the protection level for one or more content units can adaptively vary in response to changes in the information from those sources. Thus, user interface 406 may be programmed to enable an administrator 408 to specify one or more information sources from which information can be retrieved for evaluation by one or more policies. The information sources can be specified in any suitable manner, as the techniques described herein are not limited to identifying information sources, or collecting information from them, in any particular way. For example, the user interface 406 may enable an administrator 408 to specify a computer address from which pieces of information may be obtained. The computer address may include a website address or any other type of address, as the techniques presented herein are not limited in this respect.

User interface 406 may further enable an administrator 408 to specify in any suitable manner how information should be retrieved from a specified information source. For example, when information is retrieved from a website, the administrator 408 may define keywords or keystrokes that enable the website to be navigated to retrieve the desired information. Of course, information can be retrieved from a website in any desired manner, as the techniques described herein are not limited in this respect. Additionally or alternatively, information may also be retrieved from other sources, such as files or databases maintained on the local computer network on which the server computer 403 resides or on any other network, and/or from other computer systems or devices, as the techniques described herein are not limited in this respect.

The information available from one or more information sources can vary over time, so that any policy that evaluates the information can adapt the protection level for one or more content units accordingly. The manner in which the information can vary over time is dependent upon the type of information and/or the source from which it is collected and the techniques described herein are not limited in any respect to the ways in which the information can vary over time. For example, when the information is available from a website, a website administrator can update the information on a regular basis, e.g., in response to one or more events or in any other suitable manner. Referring to the example above wherein a government agency can establish a security threat level, the information can be provided on a website and may be updated in response to any event(s) that may cause a change in the security threat level. In the examples described above wherein the information source provides historical information relating to activity within the computer system or elsewhere, a data repository (a database) can be constantly updated as events take place to record those events. It should be appreciated that these are merely examples of the types of information and sources thereof that can be evaluated in accordance with the techniques described herein, and that numerous other types of information and sources can be evaluated, including sources that may be updated in any suitable manner.

The DRM policy server 402 can be programmed to collect information from the one or more sources 412, 414, 416 in any suitable manner, as the techniques described herein are not limited to any particular implementation technique. In accordance with one embodiment described below, software plugins can be used to facilitate the configuration of the DRM policy server by an administrator. In this respect, the administrator can configure the DRM policy server to enable the definition of one or more policies that evaluate information collected from one or more sources, and can then program one or more plugins to retrieve the desired information from the one or more sources. The use of plugins simplifies the implementation of the DRM policy server. However, it should be appreciated that the techniques described herein are not limited to implementing a DRM policy server using plugins, and that other techniques can be employed to enable an administrator to implement policies that evaluate information collected from one or more sources.

In accordance with one embodiment, the DRM policy server 402 may be programmed so that one or more policies may evaluate information maintained by the DRM system, so that one or more policies may adaptively vary the protection level for one or more content units in response to changes in that information. The information maintained by the DRM policy server 402 can be stored on the storage device 404 that is coupled to the computer 403, on the computer 403 itself, or in any other location accessible to the computer 403. In one embodiment, the information maintained by the DRM system comprises usage history information relating to actual and/or attempted access to protected content units and/or actions performed on the protected content units managed by the DRM system. Usage history information may include information about user requests to access protected content units, whether access was granted, when such access was requested and/or granted, what actions (e.g., view, edit, copy, save, print, forward) users performed on the content, and/or any other usage information. These are merely examples, as the usage information maintained by the DRM system can be of any type, and can be used to adapt the protection level for one or more protected content units in any desired manner, as the techniques described herein are not limited to using any specific types of information and/or to adapting the protection level for one or more content units in any particular manner based upon such information.

Much as discussed above in connection with the various ways in which the information collection functionality can be implemented in the DRM system (e.g., being hard coded in the DRM policy server 402 or via a plugin that interfaces with the DRM policy server 402), the other functionality of the DRM system described herein can be implemented in any suitable manner, as the techniques described herein are not limited to any particular implementation techniques. In accordance with one embodiment discussed below, the techniques described herein for implementing one or more policies that adaptively vary the protection level for one or more content units can be implemented via a server extension as described below in connection with FIG. 4, rather than being hard coded in the DRM policy server itself. This may be desirable in a commercial environment wherein it is desired to make available multiple versions of a DRM system with different (e.g., some optional) types of functionality, so that non-core (e.g., optional) features can be provided in one or more server extensions, as opposed to being hard coded into the core code for the DRM policy server. However, it should be appreciated that the techniques described herein are not limited to being implemented in a server extension, and can be hard coded in the core DRM policy server software as discussed above in connection with FIG. 3, or implemented in any other suitable manner, as the techniques described herein are not limited to any particular implementation technique.

Figure 4:
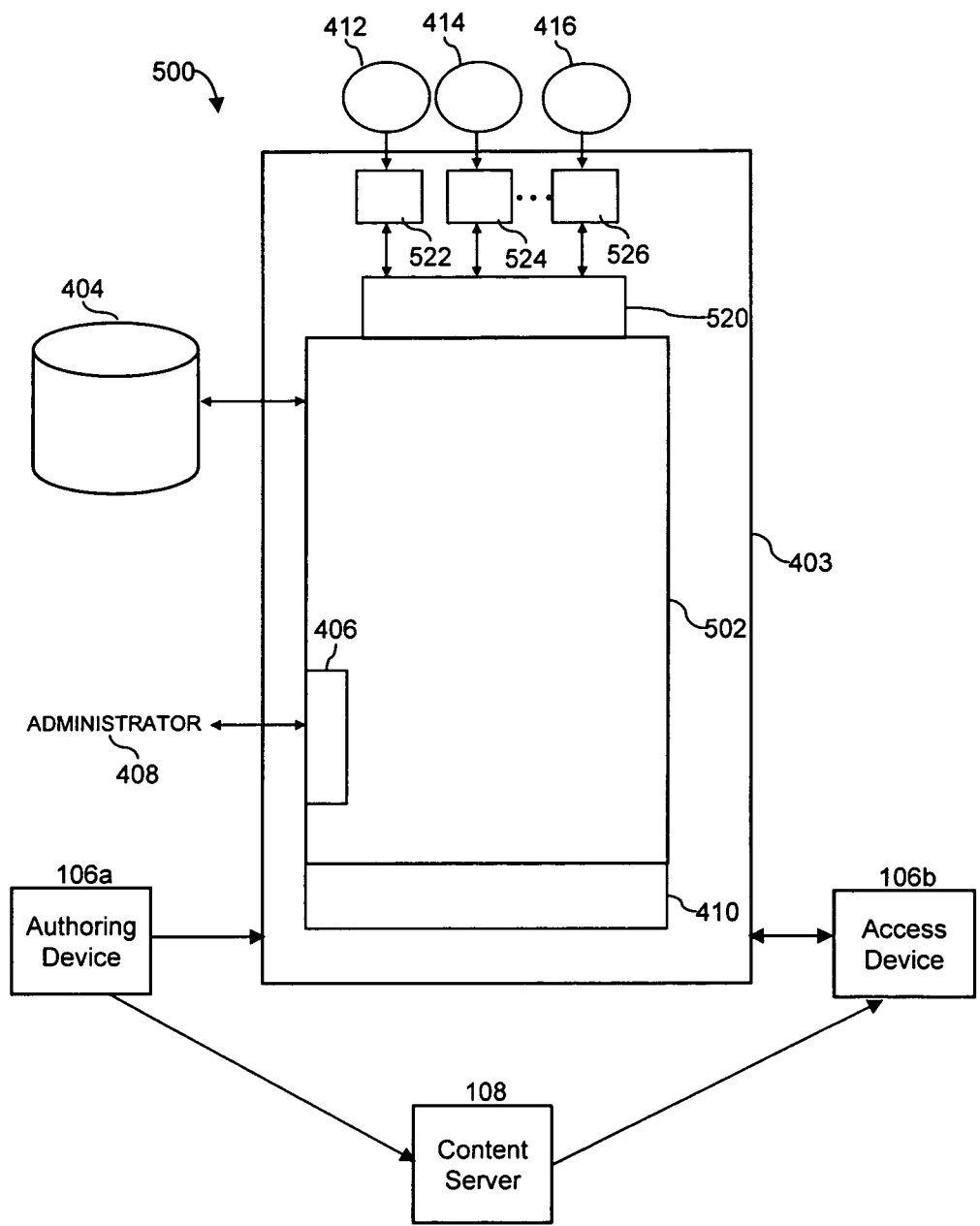
FIG. 4 is a block diagram of a system including a policy server, an associated server extension and information collectors that collectively implement an adaptive protection level in accordance with one embodiment.

FIG. 4 illustrates an exemplary DRM system 500 that is similar in many respects to the system 400 of FIG. 3, but wherein the functionality of the DRM system that supports adaptively varying the protection level for one or more content units is performed by a server extension and information collection plugins, rather than being hard coded in the core software of the DRM policy server. It should be appreciated that the server extension can be programmed exclusively to implement the capabilities described herein of adaptively varying one or more protection levels, or this functionality can be included in the server extension with code that implements other (e.g., auxiliary or optional) features of the DRM system.

The DRM system 500 of FIG. 4 includes many of the same components of the system 400 of FIG. 3. However, the DRM policy server 502 is not hard coded with the functionality to retrieve information from one or more external sources or to implement one or more policies that can adaptively vary the protection level for one or more content units. Rather, that functionality is provided by information collector plugins 522, 524 and 526 that can be programmed to collect information from the one or more external information sources 412, 414, 416, and via a server extension 520 that can enable the implementation of policies that can adapt the protection levels of one or more content units.

It should be appreciated that the use of plugins to collect information from one or more sources and the use of a server extension to enable the implementation of an adaptive policy that evaluates the information collected from one or more sources need not be employed together, as other configurations are possible. For example, the information collecting functionality alternatively can be hard coded in the DRM policy server 502 or can be provided directly in the server extension 520. In addition, as discussed above, information collecting plugins can also be used in connection with a DRM policy server that has in its core software the capability of implementing policies that adaptively vary one or more protection levels based upon the collected information.

In the illustrative implementation shown in FIG. 4, the user interface 406 and the connection to the storage device 404 both are provided in the DRM policy server 502, but it should be appreciated that a user interface and/or an interface to one or more storage devices coupled to the computer 403 alternatively can be provided via the server extension 520.

Policy server 502 and/or policy server extension 520 may be provided with one or more application programming interfaces that provide an interface that can allow a system administrator or other user to create information collection plugins that can be registered with the policy server extension and/or policy server. Information collector plugins 522, 524, and 526, may be customized by a user. Alternatively or additionally, one or more standardized information collector plugins may be provided (e.g., by a vendor that provides the DRM policy server or a third party) and selected by a user to collect information from one or more information sources.

As discussed above in connection with FIG. 3, the information sources 412, 414, 416 can be of any type (e.g., can provide information relating to usage or activity in the computer system to which the DRM system belongs, information relating more broadly usage or activity to other computer systems, information provided by a website relating to a national security threat level, or any other type of information source). The information collectors 522, 524, 526 can take any suitable form that is appropriate for collecting a desired type of information. In addition, while three information collectors 522, 524, 526 are shown in FIG. 4, it should be appreciated that the techniques described herein are not limited in this respect, and that any number of information collectors can be employed to collect information from any desired number of information sources. In addition, as discussed above, in accordance with one embodiment of the present invention, the DRM system can adaptively vary the protection level for one or more content units based upon information maintained by the DRM system itself. It should be appreciated that information maintained by the DRM system itself can be used exclusively as a basis for adapting one or more protection levels so that no information collectors need be employed to gather information from other sources, DRM system maintained information can be used together with information gathered from one or more other sources, or the DRM system can adaptively vary one or more protection levels based solely on information gathered from outside the DRM system, as the techniques described herein are not limited in this respect.

Figure 5:
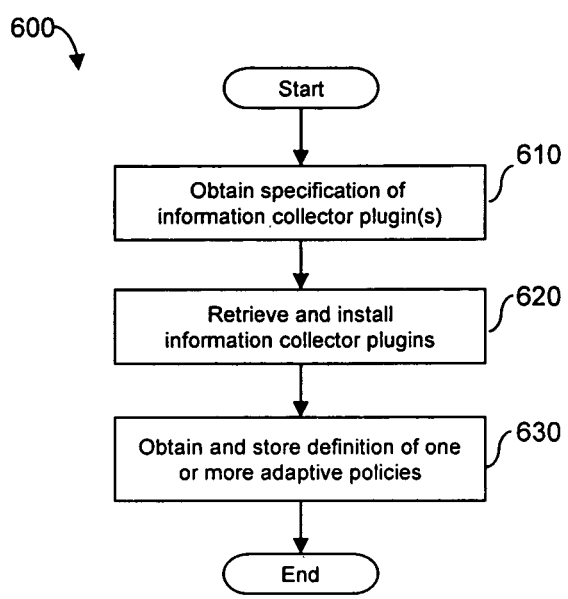
FIG. 5 is a flowchart of a process for defining a policy and information evaluated by the policy to implement an adaptive protection level in accordance with one embodiment.

FIG. 5 is a flowchart of an illustrative process 600 for configuring a DRM system to enforce one or more policies that collect information and adaptively vary the protection level for one or more content units in response to changes in that information. Process 600 may be performed by the DRM system (e.g., the policy server 402 in FIG. 3, the policy server 502 and/or policy server extension 520 in FIG. 4, or elsewhere). As should be appreciated, process 600 need not be performed on solely one computer, and can be distributed amongst multiple computers in the DRM system or elsewhere.

Process 600 may be called in response to an administrator (or other user) interacting with a user interface provided by the DRM system (e.g., via the policy server and/or the policy server extension, such as the user interface 406 in FIGS. 4 and 5). The user interface may enable the administrator to define one or more policies for protected content units, wherein one or more of the defined policies may adaptively vary the protection level for one or more content units in response to one or more conditions.

Process 600 may be called in response to an administrator (or other user) taking some action relating to defining one or more policies to define a protection level for one or more content units, or to modify one or more previously defined policies. Initially, the process begins in act 610, wherein a specification of one or more information collector plugins which are to be installed is obtained from the administrator or user. The specification may include a list of one or more information collector plugins to be installed and an indication of from where the information collector plugins can be obtained (e.g., an address where the plugins reside, such as a website address or a storage device address, or any other suitable indication). The process then proceeds to retrieve and install the information collector plugins (act 620) using the specification provided in act 610 (e.g., names and locations of the plugins). The plugins can be retrieved in any suitable manner, which can vary depending upon where the plugins are located and the manner in which they are identified in the specification. Once the plugins are retrieved, installation may be performed, so that the plugins are registered with the DRM policy server and/or a policy server extension (when used). The policy server and/or the policy server extension (referred to collectively as the policy server program) may provide services that enable the plugins to register with the policy server program and may provide a protocol that facilitates the exchange of information between the plugins and the policy server program.

While the process illustrated in FIG. 5 retrieves and installs information collect or plugins in response to receipt of a specification thereof, it should be appreciated that other techniques for installing one or more information collector plugins are possible. For example, an administrator can install one or more information collector plugins directly on the same computer employed by the policy server program and provide information (e.g., a file system path name) about where the information plugin(s) has been installed.

The plugins may be registered with the policy server program to allow the information collector plugins to collect information from specified sources and communicate the collected information to the policy server program. As discussed above, the collected information can be of any desired type, including information about environmental conditions in the computer system to which the DRM system belongs or more globally beyond it, information about historical usage of protected content units, or any other desired information.

In act 630, the policy server program may obtain and store one or more policy definitions provided, for example, by an administrator and/or authorized user. The policy server program may store the policy definitions at any suitable location, such as locally on the policy server computer, on a secure storage device accessible to the policy server program, and/or at any other suitable storage location.

In accordance with one embodiment, an administrator or user can define one or more policies that evaluate information obtained by one or more of the information collectors so that the protection level for one or more protected content units can adaptively vary in response to changes in the collected information. In one embodiment, an indication of the various types of information available from one or more information collectors can be provided to the administrator or user to facilitate their defining one or more policies. However, the techniques described herein are not limited in this respect. For example, an administrator or user may establish one or more policies in conjunction with the installation of one or more information collectors customized specifically to collect information desired for the established policy/policies, so that the user may be aware of the relevant information that can be evaluated by the policy/policies.

An administrator and/or authorized user can define a policy using any suitable interface supported by the policy server program (e.g., using if/then statements) as the techniques described herein are not limited in any respect by the way in which policies are defined.

It should be appreciated that process 600 is just one example of a process by which a DRM system can be programmed to collect information and implement one or more policies that evaluate the information to adaptively vary the protection level for one or more content units in response to changes in that information. It should be appreciated that the specification of policies and the installation of one or more information collector plugins can be performed in any order, including an order that alternates the installation of some information collector plugins with the defining of one or more policies. In addition, as discussed above, the techniques described herein relating to defining one or more policies that adaptively vary the protection level for one or more content units is not limited to employing information collector plugins at all.

Each policy can be associated with one or more protected content units to which it applies in any suitable manner, as the techniques described herein are not limited to use with a system that performs such an association in any particular manner. As one example, the techniques described herein can be used with a system such as that described in connection with FIG. 1 wherein a policy can be associated with a content unit when the content unit is created using an authoring device. In accordance with another embodiment of the invention, the administrator or user who creates a policy can be provided with the capability of associating it with one or more protected content units either by identifying them directly or by identifying a class of content units to which they belong. A class of protected content units can be as small or large (e.g., all of the content units registered with the DRM system) as desired, as the techniques described herein are not limited in this respect.

In accordance with one embodiment, a protected content unit may be associated with multiple policies, one or more of which may be configured to adaptively vary the protection level for the content unit in response to any of the types of conditions described above.

Figure 6:
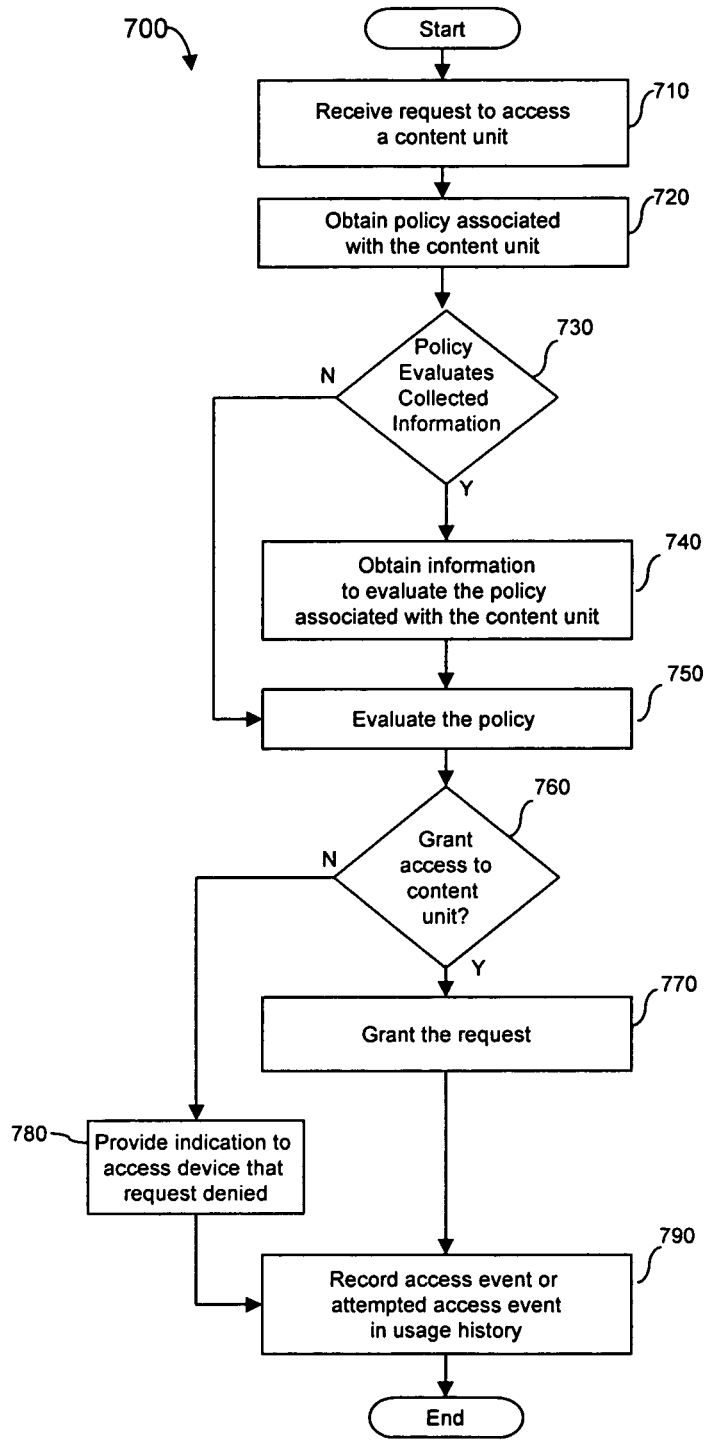
FIG. 6 is a flowchart of a process for determining a protection level specified by a policy that implements an adaptive protection level in accordance with one embodiment.

FIG. 6 is a flowchart of an illustrative process 700 for determining a current protection level for a content unit that may be protected in accordance with an adaptive policy that evaluates one or more conditions in accordance with one embodiment. The process can be employed with any type of DRM system (examples of which are shown in FIGS. 4 and 5) and may be performed by the policy server program (e.g., a policy server alone or in combination with a server extension as described above) executing on a single computer or distributed among multiple computers, and/or on components of the DRM system that reside on an access device (e.g., a DRM system plugin as described above), as the process is not limited in any respect by the nature of the system configuration that it executes upon.

The process of FIG. 6 may be initiated in any of numerous ways. For example, in a DRM system implemented in a manner similar to that shown in FIG. 1, the process may be initiated in response to a request issued from an access device to the DRM policy server seeking to access a protected content unit.

The process 700 begins at act 710 wherein a request for access to a protected content unit is received (or alternately in response to a request (not shown) to update a protection level). Such a request may be provided by an access device from which a user is attempting to access a protected content unit as described, for example, in connection with the DRM system of FIGS. 4 and/or 5. The user may have been authenticated by the DRM system in any suitable manner (examples of which were described above in connection with FIG. 1).

After the request is received, the process (at act 720) obtains the policy associated with the requested content unit. The associated policy may be obtained in any suitable manner. For example, if an association between a protected content unit and a policy is stored on the policy server computer and/or a storage device accessible to it, the process may obtain the stored association. As discussed above, the association may be stored when the content unit is registered with the DRM system, and may employ a unique identifier that identifies the protected content unit registered to the DRM system and the policy which should be applied to the protected content.

After the policy has been obtained, the process proceeds to act 730, wherein a determination is made as to whether the policy evaluates any information collected by one or more information collectors. When it is determined that the policy does evaluate such collected information, the process proceeds to act 740, wherein the pieces of information are collected. The information can be collected using one or more information collectors that can be implemented in any suitable manner as described above. For example, the process can communicate with one or more information collectors that are configured to obtain the information evaluated by the policy, and in response the information collectors can obtain the information to insure that the collected information is up to date.

After any information to be evaluated from an information collector is obtained, or when it is determined in act 730 that the policy evaluates no such information, the process proceeds to act 750, wherein the policy is evaluated to determine whether to grant the requested access to the content unit. The evaluation of the policy can be performed in any suitable manner depending upon the nature of the policy, including the factors that it considers in determining whether to grant or deny the requested access. It should be appreciated that when the policy is one that evaluates information collected by one or more information collectors, the retrieval of the desired information to ensure that it is up to date prior to evaluating the policy can result in the policy adapting the protection level for one or more content units in response to the up to date status of the one or more conditions indicated by the collected information.

Based upon the evaluation of the policy, a determination is made (in act 760) of whether to grant the user the requested access to the protected content unit. As discussed above, the policy can evaluate numerous factors, examples of which include the identity of the authenticated user, the nature of the accessing device through which access is sought, the actions that are requested to be performed on the content units, historical usage information, environmental conditions, or any of the other types of information that can be collected as discussed above.

When a determination is made that, based upon the policy, the requested access to the content unit should be denied, the process proceeds to act 780, wherein an indication that the request should be denied is provided (e.g., via the access device) to the user. This can be accomplished in any suitable manner. For example, in a system such as that illustrated in FIG. 1, a DRM system plugin can be provided on the access device and can receive either an indication of denial of the request from the DRM policy server or information from the DRM policy server that enables the plugin or the accessing device to make the final determination based upon one or more actions that the user attempts to take with respect to the content unit. In either case, the DRM system plugin on the access device can communicate a denial of an attempted access (e.g., through a user interface on the access device) to the user. This is merely one example, as the techniques described herein are not limited to any particular implementation with respect to which component of a DRM system makes the determination of whether to grant or deny access, nor to any particular technique for communicating the denial of an access request to the user.

When it is determined at act 760 that access should be granted, the process proceeds to act 770, wherein the request is granted. This can be performed in any suitable manner, as the techniques described herein are not limited to use in a DRM system that is implemented in any particular way in this respect. As one example, in a DRM system such as that described in connection with FIG. 1, the granting of permission for a user to perform a particular action on a protected content unit is a two-stage process. Initially, the DRM policy server can determine whether the user has the ability to perform any actions at all with respect to the requested content unit. If not, access will be denied and an indication thereof will be provided at act 780. Alternatively, when the DRM policy server determines that the user is authorized to perform at least some actions with respect to the protected content, the DRM policy server can provide information to the DRM system plugin on the access device to enable such actions. For example, the DRM system may transmit a content key to the access device to enable it to decrypt the unit of content along with policy information that specifies what actions the user may take on the requested content unit so that the DRM system plugin installed thereon can enforce the protection level defined by that policy information. Thus, each time a user seeks to take a new action with respect to a protected content unit, the policy information provided to the DRM system plugin can ultimately determine whether to grant the request to take the particular action.

It should be appreciated that in accordance with one embodiment, when a policy is defined that adapts the protection for one or more content units based upon information that is collected and can vary over time, the information may be collected via a policy server which can then send to DRM software (e.g., a plugin) on the access device policy information that enables the access device to implement the desired protection level. Examples of such systems include the systems described above in connection with FIG. 1 and the system described in U.S. patent application Ser. No. 11/479,119, entitled ACCESSING RIGHTS-MANAGED CONTENT FROM CONSTRAINED CONNECTIVITY DEVICES (which is incorporated herein by reference). It should be appreciated that in accordance with some such systems, once the policy information has been sent to the access device, changes in any information upon which the protection level for the content unit can be based that occur subsequent to the time that the policy information is sent to the accessing device but before a particular action is taken on the protected content on the access device may not be reflected in the policy information at the access device. Potential staleness of the policy information on the access device can be addressed in any of numerous ways, as the techniques described herein are not limited to any particular implementation.

In accordance with one embodiment, the protection level information provided to the access device can be provided along with expiration information that specifies an event (e.g., expiration of a particular time limit or another event) that will render the protection information stale and unusable, so that the access device will need to communicate again with the DRM policy server to receive updated policy information before allowing a user to take any action with respect to an impacted protected content unit. Examples of such a technique are described in the above-referenced Ser. No. 11/479,119 application.

In accordance with another embodiment, in response to one or more events monitored by the DRM policy server (e.g., security-related conditions), the DRM policy server can communicate with one or more access devices to update the policy information previously provided for one or more content units to reflect the changes in one or more monitored conditions, or alternatively can send an instruction to one or more access devices to invalidate their previously-received policy information upon the occurrence of one or more events. Thus, when one or more monitored events occurs that can impact the protection level for one or more content units, the DRM policy server can proactively insure that access devices cannot allow access to one or more content units based upon previously provided and now out-of-date policy information.

It should be appreciated that the techniques described above for dealing with potential staleness of protection level information provided to an accessing device are merely illustrative, and that numerous other techniques can be provided. In addition the techniques described herein and not limited to use in a system that provides techniques for addressing potential staleness of protection level information, as no such techniques need be employed.

In accordance with one embodiment, a record of the access to the protected content unit may be made in act 790, and the process may terminate. Such a record may include the identity of the user, the location of the user, the time of attempted access, any actions performed by the user on the protected content unit, and/or any other suitable information. The record of the access event may be stored in any location on the system, (e.g., in a usage history database which may reside on the policy server computer, on any other computer, on an external storage device, and/or on any other suitable location). In some embodiments, stored usage history information, including information relating to access events and attempted access events, may be used as information that may be evaluated by policies to determine protection levels, as previously described.

As should be appreciated from the foregoing, numerous techniques described herein can be used independently of one another. Thus, while in some embodiments all of the above-described features can be used together, any combination or subset of the features described above can be employed together in a particular implementation, as the aspects of the present invention are not limited in this respect.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

It should be appreciated that the various processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code. In this respect, it should be appreciated that one embodiment of the invention is directed to a computer-readable medium or multiple computer-readable media (e.g., a computer memory, one or more floppy disks, compact disks, optical disks, magnetic tapes, etc.) encoded with one or more programs that, when executed, on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above.

It should be understood that the term "program" is used herein in a generic sense to refer to any type of computer code or set of instructions that can be employed to program a computer or other processor to implement various aspects of the present invention as discussed above. Additionally, it should be appreciated that according to one aspect of this embodiment, one or more computer programs that, when executed, perform methods of the present invention need not reside on a single computer or processor, but may be distributed in a modular fashion amongst a number of different computers or processors to implement various aspects of the present invention.

Various aspects of the present invention may be used alone, in combination, or in a variety of arrangements not specifically discussed in the embodiments described in the foregoing, and the aspects of the present invention described herein are not limited in their application to the details and arrangements of components set forth in the foregoing description or illustrated in the drawings. The aspects of the invention are capable of other embodiments and of being practiced or of being carried out in various ways. Various aspects of the present invention may be implemented in connection with any type of network, cluster or configuration. No limitations are placed on the network implementation.

Accordingly, the foregoing description and drawings are by way of example only.

Also, the phraseology and terminology used herein is for the purpose of description and should not be regarded as limiting. The use of "including," "comprising," or "having," "containing," "involving," and variations thereof herein, is meant to encompass the items listed thereafter and equivalent thereof as well as additional items.

What is claimed is:

1. A method for responsively varying access to a plurality of content units, the method comprising:
    providing a digital rights management (DRM) system, wherein the DRM system includes one or more servers, the DRM system controlling access to each of the plurality of content units, the access responsive to at least one environmental condition relating to at least one condition external to the DRM system;
    receiving a request to access one of the plurality of content units from a requesting computer system via a network connection, the at least one environmental condition being based on a different content unit from the requested one of the plurality of content units;
    evaluating, by the one or more servers of the DRM system, the at least one environmental condition;
    adaptively adjusting, by the one or more servers of the DRM system, a protection level of the requested one of the plurality of content units automatically based on the evaluating the at least one environmental condition; and
    providing, by the DRM system, access to the requested content unit to the requesting computer system via the network connection without requiring the requesting computer system to modify its operating system, wherein the access is restricted based upon the adjusted protection level, the adjusting the protection level being performed prior to the providing access to the requested content via the network connection.

2. The method of claim 1, wherein controlling access to each of the plurality of content units comprises controlling actions relating to each of the plurality of content units.

3. The method of claim 1, wherein controlling access to each of the plurality of content units comprises controlling which users may access each of the plurality of content units.

4. The method of claim 1, wherein the at least one environmental condition further comprises at least one condition relating to activity on the requesting computer system requesting access to the one of the plurality of content units.

5. The method of claim 1, wherein the at least one environmental condition further comprises at least one condition relating to activity on a computer system other than the DRM system.

6. The method of claim 1, wherein the at least one environmental condition further comprises at least one condition relating to security on the requesting computer system requesting access to the one of the plurality of content units.

7. The method of claim 1, wherein the at least one environmental condition further comprises at least one condition relating to security on the DRM system.

8. The method of claim 1, wherein the at least one environmental condition further comprises security information provided by a third party.

9. The method of claim 1, further comprising:
receiving a second request to access the one of the plurality of content units;
evaluating, by the DRM system, a second of the at least one environmental condition;
adjusting, by the DRM system, a second protection level of at least the one of the plurality of content units based on the evaluating the second of the at least one environmental condition; and
providing, by the DRM system, access to the requested content unit, wherein the access is based upon the adjusted second protection level.

10. The method of claim 9, wherein the second at least one environmental condition is different from the at least one environmental condition.

11. A computer program product, comprising a non-transitory computer usable medium having a computer readable program code embodied therein to be executed by one or more processors, the program code including instructions to:
control access, by a DRM system, to each of a plurality of content units, the access responsive to at least one environmental condition relating to at least one condition external to the DRM system;
receive a request to access one of the plurality of content units from a requesting computer system via a network connection, the at least one environmental condition being based on a different content unit from the requested one of the plurality of content units;
evaluate, by the DRM system, the at least one environmental condition;
adaptively adjust, by the DRM system, a protection level of the requested one of the plurality of content units automatically based on the evaluating the at least one environmental condition; and
provide, by the DRM system, access to the requested content unit to the requesting computer system via the network connection without requiring the requesting computer system to modify its operating system, wherein the access is restricted based upon the adjusted protection level, the adjusting the protection level being performed prior to the providing access to the requested content via the network connection.

12. The computer program product of claim 11, wherein controlling access to each of the plurality of content units comprises controlling actions relating to each of the plurality of content units.

13. The computer program product of claim 11, wherein controlling access to each of the plurality of content units comprises controlling which users may access each of the plurality of content units.

14. The computer program product of claim 11, wherein the at least one environmental condition further comprises at least one condition relating to activity on the requesting computer system requesting access to the one of the plurality of content units.

15. The computer program product of claim 11, wherein the at least one environmental condition further comprises at least one condition relating to activity on a computer system other than the DRM system.

16. The computer program product of claim 11, wherein the at least one environmental condition further comprises at least one condition relating to security on the requesting computer system requesting access to the one of the plurality of content units.

17. The computer program product of claim 11, wherein the at least one environmental condition further comprises at least one condition relating to security on the DRM system.

18. The computer program product of claim 11, wherein the at least one environmental condition further comprises security information provided by a third party.

19. A method for responsively varying access to a plurality of content units, the method comprising:
providing a DRM system, wherein the DRM system includes one or more servers, the DRM system controlling access to each of the plurality of content units, the access responsive to at least one environmental condition relating to at least one condition external to the DRM system;
receiving a first request to access one of the plurality of content units from a requesting computer system via a network connection, the at least one environmental condition being based on a different content unit from the requested one of the plurality of content units;
evaluating, by the one or more servers of the DRM system, a first of at least one environmental condition;
adaptively adjusting, by the one or more servers of the DRM system, a first protection level of the requested one of the plurality of content units automatically based on the evaluating the first of the at least one environmental condition;
providing, by the DRM system, access to the requested content unit to the requesting computer system via the network connection without requiring the requesting computer system to modify its operating system, wherein the access is restricted based upon the adjusted first protection level, the adjusting the protection level being performed prior to the providing access to the requested content via the network connection;
receiving a second request to access the one of the plurality of content units from the requesting computer system;
evaluating, by the one or more servers of the DRM system, a second of the at least one environmental condition;
adaptively adjusting, by the one or more servers of the DRM system, a second protection level of at least the one of the plurality of content units automatically based on the evaluating the second of the at least one environmental condition; and
providing, by the DRM system, access to the requested content unit to the requesting computer system, wherein the access is based upon the adjusted second protection level.

20. The method of claim 19, wherein the second at least one environmental condition is different from the first at least one environmental condition.

* * * * *